US012782602B2

(12) United States Patent
Lezak et al.

(10) Patent No.: US 12,782,602 B2
(45) Date of Patent: Nov. 3, 2026

(54) WEATHER PREDICTOR USING WEATHER CYCLES

(71) Applicant: Weather 2020, LLC, Kansas City, MO (US)

(72) Inventors: Gary Lezak, Kansas City, MO (US); Maxwell Conradt, Leawood, KS (US); Robert Lyons, Kansas City, KS (US)

(73) Assignee: Weather 2020, LLC, Kansas City, MO (US)

( * ) Notice: Subject to any disclaimer, the term of this patent is extended or adjusted under 35 U.S.C. 154(b) by 486 days.

(21) Appl. No.: 18/081,034

(22) Filed: Dec. 14, 2022

(65) Prior Publication Data

US 2023/0194754 A1 Jun. 22, 2023

Related U.S. Application Data

(60) Provisional application No. 63/291,674, filed on Dec. 20, 2021.

(51) Int. Cl.
*G01W 1/10* (2006.01)

(52) U.S. Cl.
CPC .................................... *G01W 1/10* (2013.01)

(58) Field of Classification Search
CPC ................................ G01W 1/10; Y02A 90/10
See application file for complete search history.

(56) References Cited

U.S. PATENT DOCUMENTS

| | | | | |
|---|---|---|---|---|
| 8,204,846 | B1 * | 6/2012 | Crawford | G06N 7/01 706/62 |
| 2004/0215394 | A1 * | 10/2004 | Carpenter, Jr. | G01W 1/10 702/3 |
| 2008/0288417 | A1 * | 11/2008 | Luessi | G01W 1/10 705/36 R |
| 2015/0285952 | A1 * | 10/2015 | Gupta | G01W 1/10 702/3 |
| 2017/0024523 | A1 * | 1/2017 | Gutfraind | G16H 40/20 |
| 2017/0249056 | A1 * | 8/2017 | Rainey | G06F 16/9537 |

(Continued)

FOREIGN PATENT DOCUMENTS

| | | | | | |
|---|---|---|---|---|---|
| CN | 107092793 | A | * | 8/2017 | G16Z 99/00 |
| CN | 112799156 | B | * | 7/2021 | G06Q 10/04 |
| KR | 20110099509 | A | * | 9/2011 | G06Q 10/04 |

OTHER PUBLICATIONS

PCT Patent Application PCT/US2022/053322 International Search Report and Written Opinion issued May 3, 2023.

(Continued)

*Primary Examiner* — Lal Ce Mang
(74) *Attorney, Agent, or Firm* — Erise IP, P.A.

(57) ABSTRACT

Methods, systems, and media for obtaining weather data from around the world determining accurate long-range weather models is disclosed. Historic weather data may be collected from weather databases and a long-range weather model may be generated based on the historic weather data. Furthermore, more recent weather data indicative of weather from around the world may be collected from databases and sensors. Weather cycles indicative of repeating weather patterns may be predicted from the historic and the recent weather data and the long-range weather model may be updated to a predictive weather model based on the weather cycles and the recent weather data.

20 Claims, 7 Drawing Sheets

(56) References Cited

U.S. PATENT DOCUMENTS

| | | | | |
|---|---|---|---|---|
| 2018/0364394 | A1* | 12/2018 | Phillips | G01W 1/10 |
| 2020/0110185 | A1* | 4/2020 | Xu | G01V 1/181 |
| 2020/0355845 | A1* | 11/2020 | Mecikalski | G01W 1/10 |

OTHER PUBLICATIONS

"Introduction of the LRC", Weather 20/20 LLC, Apr. 4, 2021, https://weather2020.substack.com/p/introduction-of-thelrc-48aa726c4e25.

Namias, Jerome, "The Index Cycle and Its Role In The General Circulation", Journal of Meteorology, Jan. 1950, pp. 130-139, vol. 7, U.S. Weather Bureau Washington 30th Anniversary Meeting of the American Meteorological Society at St. Louis.

* cited by examiner

WEATHER PREDICTOR USING WEATHER CYCLES

RELATED APPLICATIONS

This non-provisional patent application claims priority benefit, with regard to all common subject matter, of earlier-filed U.S. Provisional Patent Application No. 63/291,674 filed Dec. 20, 2021, and entitled WEATHER PREDICTOR USING WEATHER CYCLES. The identified earlier-filed provisional patent application is hereby incorporated by reference in its entirety into the present application.

BACKGROUND

1. Field

Embodiments of the instant disclosure relate to predicting weather. Specifically, embodiments of the instant disclosure relate to analyzing data from around the world to predict the weather based on cyclic weather patterns.

2. Related Art

Traditionally, weather prediction models rely on current and recent weather conditions to predict weather conditions accurately over the course of the next few days or weeks. Longer term models, such as ten-day models, typically incorporate average seasonal conditions with recent weather conditions and expected conditions to make longer-term predictions. Currently, there are no weather prediction models that predict the weather over the course of a year that are accurate and reliable. Any long-term weather prediction models that predict the weather over the course of a year, typically use average seasonal conditions without considering cyclic weather patterns.

Furthermore, there is a need for long-term weather prediction models so people can plan for abnormal weather conditions. Natural disasters, droughts, floods, and other weather occurrences and weather patterns are unavoidable. However, knowing, with a high likelihood, that these events are going to occur is beneficial to humanity. Discovering that a flood or a drought is imminent with only days to prepare does not give people enough time to prepare. If farmers know that there will be less rainfall than usual in the Spring with weeks and even months or years notice, the farmers can plan accordingly to reduce monetary losses and damage to their crops. The earlier that these weather patterns can be predicted, the more awareness can be increased, and the more negative effects of the weather patterns can be reduced. Food, money, and lives may be saved by employing accurate and reliable long-term weather prediction models.

Current long-term weather prediction models are inaccurate and unreliable. As such, what is needed is an accurate long-term weather prediction system that can predict the weather up to and including months in advance. The LRC™ (Lezak Recurring Cycle) is a peer-reviewed cyclic weather prediction method that represents the culmination of 80 years of evolution of cycle-based weather prediction technology.

SUMMARY

Embodiments of the present teachings solve the above-mentioned problems by providing a long-range weather prediction system based on historic weather data, cyclic weather patterns, and recent/current weather data.

In some aspects, the techniques described herein relate to a method of detecting weather and providing weather predictions across a prediction timeline, the method including: obtaining historic weather data from weather databases; analyzing the historic weather data across an historic timeline; obtaining weather cycle data indicative of a weather cycle timeline of repeating weather patterns; obtaining current weather data indicative of recent weather; generating a baseline weather model for predicting the weather based on the historic weather data; adjusting the baseline weather model based at least in part on the weather cycle data and the current weather data; and generating a weather model over the weather cycle timeline indicative of a forecast of the weather.

In some aspects, the techniques described herein relate to a method, further including: determining weather variables from the historic weather data; determining averages for each variable of the weather variables from the historic weather data; generating correction factors associated with each variable based at least in part on the weather cycle data and the current weather data; and applying the correction factors to the averages for each variable to generate the weather model.

In some aspects, the techniques described herein relate to a method, wherein the weather variables are at least precipitation amount, snow accumulation, maximum temperature, minimum temperature, average temperature, average dewpoint temperature, average wind speed, maximum wind speed, average wind direction, average relative humidity, average total cloud coverage, average sea level pressure, average pressure, and any subset and other variables that may be useful in predicting the weather, and related variable such as Heating Degree Days (HDD), Cooling Degree Days (CDD), and Growing Degree Days (GDD).

In some aspects, the techniques described herein relate to a method, wherein the weather cycle timeline is between forty-five and forty-nine days or is a user-provided cycle length for a model year that varies from year to year.

In some aspects, the techniques described herein relate to a method, wherein the weather cycle timeline is 47 days.

In some aspects, the techniques described herein relate to a method, further including determining potential ensemble outcomes based on initial conditions.

In some aspects, the techniques described herein relate to a method, further including discarding outliers indicative of weather anomalies.

In some aspects, the techniques described herein relate to a method, further including: determining a plurality of regions based at least in part on similar predicted weather conditions for each region of the plurality of regions; displaying the plurality of regions including boundaries defined by the similar predicted weather conditions; and generating and displaying at least one geographic boundary including the plurality of regions.

In some aspects, the techniques described herein relate to one or more non-transitory computer-readable media storing computer-executable instructions that, when executed by at least one processor, perform a method of detecting weather and providing weather predictions across a prediction timeline, the method including: obtaining historic weather data from weather databases, wherein the historic weather data is indicative of historic weather conditions from various locations; analyzing the historic weather data across an historic timeline; obtaining weather cycle data indicative of a weather cycle timeline of repeating weather patterns; obtaining current weather data indicative of recent weather; generating a baseline weather model for predicting the weather based on the historic weather data; adjusting the baseline weather model based at least in part on the weather cycle data and the current weather data by generating correction factors associated with weather variables of the baseline weather model; and generating a weather model based on the adjusting of the baseline weather model over the weather cycle timeline indicative of a forecast of the weather.

In some aspects, the techniques described herein relate to a media, wherein the method further includes: determining a region based at least in part on similar predicted weather conditions; and displaying the region including boundaries defined by the similar predicted weather conditions.

In some aspects, the techniques described herein relate to a media, wherein the method further includes: defining a geographic region including at least one boundary for display and displaying the boundaries within the geographic region.

In some aspects, the techniques described herein relate to a media, wherein the method further includes determining how a market associated with a particular region will be impacted by the weather model.

In some aspects, the techniques described herein relate to a media, wherein the market is agriculture or a socioeconomic recovery from expected damage based on the forecast.

In some aspects, the techniques described herein relate to a media, wherein the weather cycle timeline is between forty-five and forty-nine days or is a user-provided cycle length for a model year that varies from year to year.

In some aspects, the techniques described herein relate to a system for providing weather predictions across a prediction timeline, the system including: at least one processor; a data store; and one or more non-transitory computer-readable media storing computer-executable instructions that, when executed by the at least one processor, perform a method including: obtaining historic weather data from weather databases; analyzing the historic weather data across an historic timeline; obtaining a weather cycle data indicative of a weather cycle timeline of repeating weather patterns; obtaining current weather data indicative of recent weather; generating a baseline weather model for predicting weather based on the historic weather data; adjusting the baseline weather model based at least in part on the weather cycle data and the current weather data; generating a weather model indicative of a forecast over the weather cycle timeline; and determining how a market associated with a particular region will be impacted by the weather model.

In some aspects, the techniques described herein relate to a system, wherein the market is agriculture or a socioeconomic recovery; and wherein the method further includes determining potential ensemble outcomes based on initial conditions.

In some aspects, the techniques described herein relate to a system, wherein the method further includes: determining weather variables from the historic weather data; determining an average for each variable of the weather variables from the historic weather data; determining a correction factor for each variable based at least in part on the weather cycle data and the current weather data; and applying the correction factor to the average for each variable for generating the weather model.

In some aspects, the techniques described herein relate to a system, wherein the weather cycle timeline is between forty-five and forty-nine days or is a user-provided cycle length for a model year that varies from year to year.

In some aspects, the techniques described herein relate to a system, wherein the method further includes: determining a region based at least in part on similar predicted weather conditions; and displaying the region including boundaries defined by the similar predicted weather conditions.

In some aspects, the techniques described herein relate to a system, wherein the method further includes: generating at least one geographic boundary to display; and generating and displaying the boundaries within the at least one geographic boundary.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein.

Figure 1:
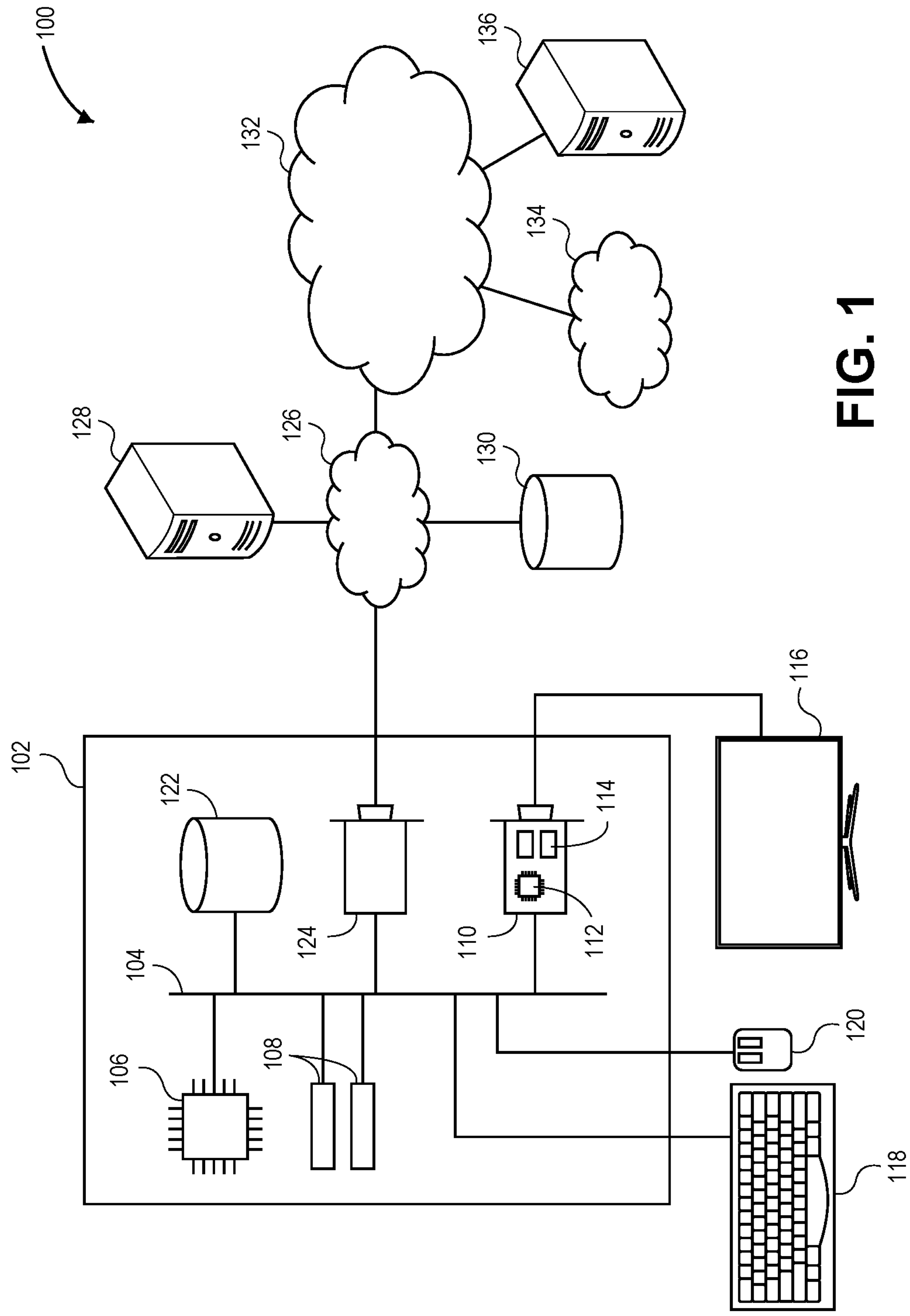
FIG. 1 depicts exemplary hardware for embodiments of the disclosure.

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

In general, embodiments of the present disclosure relate to long-term weather predictions based on historical and current weather data. Long-term weather predictions may include any time range from hours, days, up to one month, and years. Historical weather data may be collected and analyzed. Statistical predictions may be made based on the historical weather data. For example, variables that are indicative of weather conditions may be obtained from various weather stations around the world. Tracking these global weather conditions over time results in repeating weather cycles that may be adjusted by making perturbations in variable averages. The historical weather data may be analyzed to determine averages over a time frame for each variable that may be used in the weather prediction models. The variable averages may be determined based on periodic weather cycles (i.e., time frames) that may be input by the user or determined automatically. For example, recent yearly weather patterns may predict that weather conditions will repeat, or cycle, every 45 days. Such cycles are discussed, for example, in CYCLING WEATHER PATTERNS IN THE NORTHERN HEMISPHERE 70-YEARS OF RESEARCH AND A NEW HYPOTHESIS to Lezak et al. (Journal of Climatology & Weather Forecasting ISSN: 2332-2594). The above-identified article is hereby incorporated by reference in its entirety.

Therefore, the weather prediction model may predict that the variables on day 45 are the same as, or close to the same as the variables were on day 1. In various embodiments, the weather cycle may define a set time frame between and including 45 and 49 days. However, recent weather trends may be added that perturb the variables from the predicted averages. The weather variables may be perturbed from the averages based on current or more recent measurements from around the world. Millions of weather reporting locations may be accessed around the world in real time to obtain the most up-to-date weather conditions. These up-to-date weather conditions may be used to track the weather conditions around the world and compared to the conditions from the beginning of the weather cycle. Therefore, when the global weather patterns converge on the initial weather conditions at the start of the cycle (e.g., somewhere around 47 days), the cycle begins again.

Furthermore, the weather predictions may be influenced by known short-term and long-term weather conditions such as, for example, high temperature variance in winter, and unknown anomalies such as, for example, an arctic blast. Long-term weather anomalies such as, for example, El Niño Southern Oscillation Index (ENSO), and also the Arctic Oscillation (AO) & the North Atlantic Oscillation (NAO) may also be considered. All data may be collected and weighted based on factors described below to provide a complete short-term and long-term weather prediction system.

FIG. 1 illustrates an exemplary hardware platform 100 for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
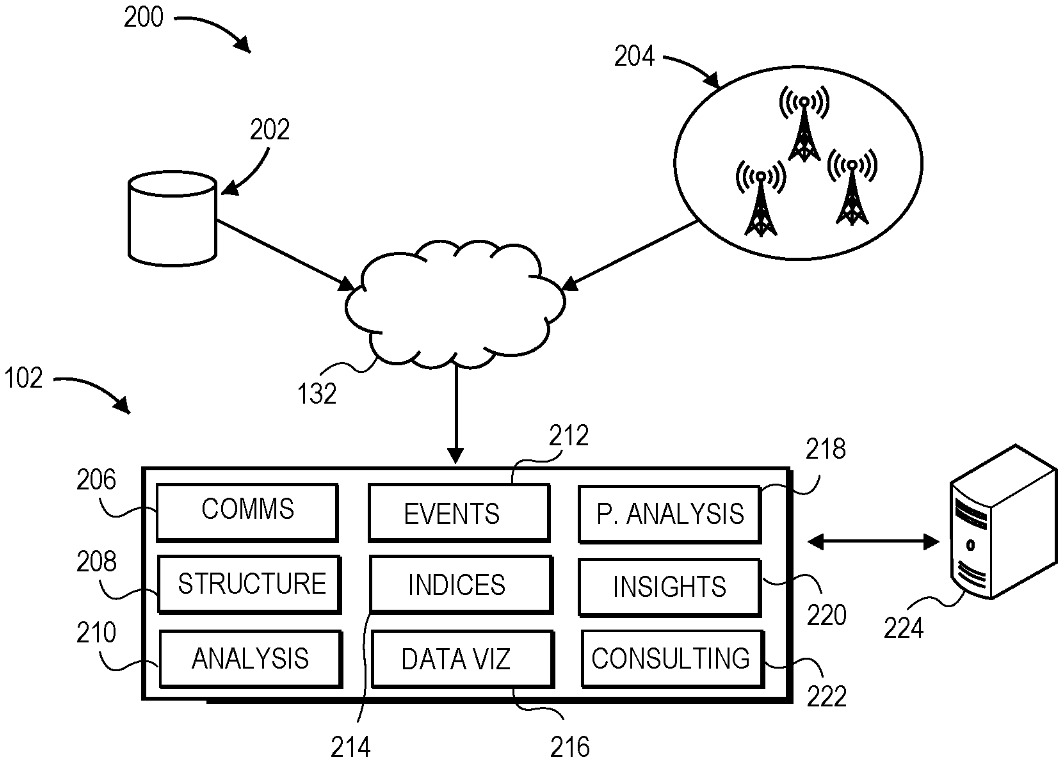
FIG. 2 depicts an exemplary weather prediction system for embodiments of the disclosure.

FIG. 2 depicts an exemplary weather prediction system 200 comprising, in some embodiments, computer 102, which may access online databases 202 and world weather stations 204 by network 134 to obtain historical weather data to analyze and predict weather patterns. The data may be obtained by communication element 206. Communication element 206 may be a server and/or any other communications device that may be capable of communications by network 134 or local network 126 as described above.

In some embodiments, historic weather data may be obtained from online database 202 such as public databases on government agency websites or private databases that provide access to historic weather data. Historic weather data may be used to analyze historical weather patterns and generate baseline weather models for each year, month, week, and day to be included in the weather predictions generated by weather prediction system 200. For example, historic weather data may be used to determine an average high temperature of 72° F. in Kansas City on October $1^{st}$. As such, if temperature is a variable in the weather prediction models, 72° F. may be the average baseline high temperature prediction for that date. As will be shown below, that average baseline value may be perturbed by more current weather conditions to provide an accurate weather forecast.

The historic weather data may be obtained from any database from any private companies and publicly available data from government organizations such as, for example, National Oceanic and Atmospheric Administration (NOAA). The historical weather data may be collected from any region around the world that may collect weather data. The weather data collected around the world may be stored in databases accessible by weather prediction system 200. Furthermore, weather prediction system 200 may obtain the weather data from world weather stations 204 around the world for including current, or recent, weather data. In some embodiments, weather stations may be satellites and collect weather data at various altitudes. As such, historic data may be gathered periodically (e.g., once a year, once a month, and the like) while current weather data may be obtained daily or continuously (e.g., as quickly as sensor updates and processing allows) and weather prediction models may also be continuously processed.

In some embodiments, data structure engine 208 may receive the historical data as well as data from world weather stations 204 and organize and filter the data into specific data structures for efficient processing by computer 102 and/or personal computer 224. These data structures may be organized into tables by variables or parameters such as, for example, locations, date and time, or the like. The data may be structured along with identifiers or markers for efficiently retrieving wanted data to perform the analysis described below. Furthermore, indices may be generated for efficiently querying the data to be analyzed and/or displayed to the user.

In some embodiments, weather variables 314 (FIG. 3D) may be obtained from the historic data and the current data and may be updated to predict the weather for specific regions and time ranges. These weather variables 314 may be date, precipitation, snow, maximum temperature, minimum temperature, average temperature, average dewpoint temperature, average wind speed, maximum wind speed, average wind direction, average relative humidity, average total cloud coverage, average sea level pressure, average pressure, and any other variables that may be useful in predicting weather conditions.

In some embodiments, long-term trends may be determined by analytics engine 210. Weather variables 314 for any region on any particular day may fluctuate from year-to-year. However, if the variables show a particular trend across a plurality of years, the trend may be added into the baseline weather prediction. For example, average high temperature for a region such as, for example, North Dakota (FIGS. 3A-3C) may be determined based on a thirty-year average. If the predicted temperature is 72° F. based on the average over the past 30 years but, on average, the temperature has increased from 70° F. to 74° F. over the last 30 years, the baseline temperature prediction may be approximately 74.1° F. based on the average temperature with the trend included. This may set a baseline value for a high temperature for a day in a region. Similarly, or alternatively, any variable of weather variables 314 may be predicted as a baseline value for a particular time range for a particular region as discussed in more detail below.

Furthermore, the temperature baseline value may not only be based on a single variable (e.g., temperature) as described in the example. The baseline temperature may be combined with the average pressure, the average humidity, average wind speed/force, average precipitation (e.g., snow, rain, hail) and the average temperature may be modeled based on the combination of average variables for that particular region during that particular time range. Similarly, or alternatively, any variable may be determined based on a weather model predicted for the region and the time frame. All averages for each variable may be combined to generate an average weather model for the region or the data. The various averages may be weighted or adjusted by correction factors to provide slight variances in the variables such that inconsistent variables may be altered to provide a complete and consistent average weather model. Furthermore, the variables in the average weather model may be perturbed using more recent weather data or "current data" as described below.

In some embodiments, weather variables 314 may be broken up into various atmospheric zones. For example, weather variables 314 may be determined at various locations but also at various altitudes within the troposphere where data is available to generate a weather model for the specific area. Weather variables 314 may be combined into a single weather model for a specific area at a specific time range as determined by the user or as calculated by weather prediction system 200.

In some embodiments, outliers may be discarded. Outliers may represent weather anomalies that skew the data and generate unpredictable or inconsistent weather patterns. For example, a hurricane may develop abnormally late when the ocean stays abnormally warm late in the year. As the data is analyzed this anomalous data may stand out by a standard deviation of more than a threshold value thus, representing an outlier. The outlier may be removed to generate consistent and predictable weather models. In some embodiments, weather models may be generated using the outlier data of the weather anomaly is found to occur more than once over the thirty-year range.

Weather variables 314 may be predicted independently as described in the example above; however, in some embodiments, a complete picture of all weather variables 314 may be used and correlations between variables may be calculated as described in more detail below. As such, the example above may be described as including all correlated variables. Therefore, the effect on the baseline temperature variable may include the fluctuations of all contributing variables as averages over the time range. For example, the weather models may be simulated over the course of the thirty-year range to determine the average of the data and a prediction of the baseline data for the weather forecast. During the simulation, changes in weather variables 314 as well as covariances and correction factors such as weighting factors may be tracked to update the model for each time measurement. For example, in some embodiments, statistical algorithms such as Kalman filters, batch filters, and the like, may be used to minimize error in the weather state space models and generate predictions of future weather based on the covariance and weights of the models using the data observed from the sensors and physical models of the changing weather. These statistical methods may provide a low-error model to generate average baseline values for weather variables 314 over time.

When the baseline modeling is complete, other variables and anomalies may be included to perturb the variables from the average baseline models to generate a complete weather prediction model and forecast the weather as described below in reference to FIGS. 3A-3D.

In some embodiments, events engine 212 may scan the data to determine the outliers described above. These outliers may be indicative of anomalous events such as, tornadoes, hurricanes, unusually high/low winds, unusually high/low precipitation, and the like. The data indicative of anomalous events may be classified by the event that the data indicates. The data may be indicative of the events based on weather variables 314 included in the events. Furthermore, as described above, the data may be excluded from the forecast predictions; however, as time goes on, if more and more of these events take place, these events may be standard and added into the forecast predictions. Furthermore, if patterns are revealed from the data analysis, cyclic weather events (El Nino Southern Oscillation (ENSO)) may be established.

In some embodiments, indices engine 214 may provide market drivers providing localized needs including energy demand and agricultural outlooks. The market drivers may map weather with corresponding market drivers to see how the markets may be impacted by the weather conditions. For example, higher/lower precipitation levels expected for a farming community may result in lower crop yield thus, raising the prices of those crops nationwide. Similarly, predictions of adverse weather patterns may lead to an expectation of property and industry damage requiring economic and social recovery. The damage may be monetarily quantified based on historic economic and social impacts from adverse weather conditions for designated regions. These impacts may be provided to the user, who may be governmental and insurance agencies such that the agencies may prepare for the upcoming large amounts of money that may be necessary to recover from the adverse weather.

In some embodiments, weather prediction system 200 may be integrated or associated with third-party socio-economic recovery applications for optimizing recovery after adverse weather. As such, not only is adverse weather forecast, but the recovery efforts may also be determined prior to the adverse weather event.

In some embodiments, data visualization engine 216 may cause display of tables and graphs for visualizing the data and analytics and may be provided to the user for easy visualization of the data and analysis results. The data visualization and analyses are described more below in reference to FIGS. 3A-3D.

In some embodiments, insights engine 218 may generate data specific to locations and markets and how those locations and markets may be affected by the weather conditions. Furthermore, recommendations may be made to limit the effects of adverse weather conditions based on the weather predictions. For example, the long-range weather forecast may provide a preliminary prediction that a drought will occur over the next several weeks followed by more precipitation than usual. Based on the weather prediction, water reserves for irrigation may be used during the drought condition with the expectation that the reserves will be replenished during the more-than-usual precipitation to follow.

In another example, recommendations based on a higher than usual likelihood of severe weather may be provided. A weather pattern may be predicted that generally results in severe weather (e.g., severe thunderstorm, tornados, hurricanes). A severity of the storms may also be predicted. The severity of the storm may also be indicative of associated costs for socioeconomic impact, evacuation, and recovery. As such, the weather predictions of system weather prediction system 200 may determine future costs and economic impact of adverse weather conditions.

In some embodiments, performance analysis engine 220 may analyze the performance of the weather prediction methods and models. Statistical analysis may be performed to evaluate how well the weather predictions were once the weather is complete and how the algorithms for predicting the long-range and short-range forecasts should be updated. These updates may be made automatically, or the user or an administrator may be notified of recommended changes.

In some embodiments, consulting engine 222 may provide communication between the user and administration to assist with any function of weather prediction system 200. Weather prediction system 200 may be used by any person and/or weather prediction group such as, for example, a meteorological department at a university or news company.

Weather prediction system 200 may be utilized to obtain the historical and current weather data, provide the analytics, and generate tables, graphs, and any other visualizations in relation to FIGS. 3A-3D and described below. FIGS. 3A-3D depict various weather pattern predictions for a specified region (e.g., North Dakota) and the various maps and tables that may be caused for display by weather prediction system 200 at computer 102 and/or personal computer 224.

In some embodiments, current weather data may be obtained by weather prediction system 200. Weather prediction system 200 may comprise computer 102 and may connect to remote network 134 and access current weather data collected by world weather stations 204 as described above. World weather stations 204 may be positioned around the world in cities and remote rural areas and may be satellites positioned in orbit. World weather stations 204 may be any data gathering sensors that collect data for modeling the weather as described herein. For example, world weather stations 204 may collect any of date, time, location, precipitation amount, snow accumulation, maximum temperature, minimum temperature, average temperature, average dewpoint temperature, average wind speed, maximum wind speed, average wind direction, average relative humidity, average total cloud coverage, average sea level pressure, average pressure, and any subset and other variables that may be useful in predicting weather, and related variable such as Heating Degree Days (HDD), Cooling Degree Days (CDD), and Growing Degree Days (GDD). The weather data may be stored as historical weather data according to the date, time, and location, and may also be input into the weather predictions system in real time to obtain quick and accurate real-time weather predictions using current weather data.

As shown in FIGS. 3A-3D, predictions are displayed relative to historical averages. The historical averages may be calculated from historical data. Furthermore, in some embodiments, the weather prediction models may be generated based on weather cycles from more recent data. A weather cycle may be detected and determined by weather prediction system 200 analyzing the historic weather data. For example, the weather may repeat in regular cycles that may be detected by the system over days, months, and years. The weather cycles may be, in the example described above, every 45 days and may be modeled accordingly. Comparing weather from day 45 to day 1 using current weather data may show that weather variables 314 are substantially the same when recent weather trends are factored in. As such, a prediction for day 90 may include the historical data from the previous 30 years as a baseline along with the variables from day 45 weighted the highest toward predicting the variables of day 90, day 1 weighted the next highest, days 44 and 46 weighted the next highest, and so forth. The current weather data may be combined with weights to the thirty-year averages to determine perturbations from the averages for the weather predictions. In some embodiments, the weights may be selected higher and lower for different days. Weather variables 314 for each day in the weather cycle may be predicted based on a cumulative average of the weighted variables from the corresponding cyclic days from the historical weather data. Each variable may be weighted similarly in the weather prediction models. This creates a prediction of the cyclic weather pattern. The weights in the system may be calculated in any method and may be updated in real time based on ever changing weather conditions. In some embodiments, the weights may be selected or calculated based on the baseline average and may be adjusted based on machine learning algorithms minimizing the error in the predicted averages based on current weather patterns (e.g., recent weather). In some embodiments, the weights may be correction factors that may be added to the average data such as, for example, percentages, and differences between weighted variables from the averages and weighted variables from the current data and simulation data. In some embodiments, the variables may be tracked and compared to the days of the weather cycles. As such, if the modeling of the weather cycle is skewed by a day or two, the weather prediction models may discover the offset and adjust the cyclic prediction accordingly.

In some embodiments, a user of the weather prediction system may determine the weather cycle and input a time range for the weather cycle in days, months, or years. As described above, the input range would be 45 days. Again, the weather cycle may be used to predict the weather by using the historical weather data and weighting the data according to the weather cycle as described above.

In some embodiments, the weather cycle may create a baseline model that is subject to modification based on current conditions and known long-term and short-term weather patterns. In some embodiments, the long-term weather patterns may be known repeating weather patterns such as repeating changes in the jet stream based on season, wet and dry seasons at various locations, hurricane season, tornado season, and even longer periodic conditions such as the El Nino Southern Oscillation (ENSO). In some embodiments, potential ensemble outcomes/results may be based on additional initial conditions such as new ENSO, North Atlantic Oscillation (NAO), Atlantic Oscillation (AO), data as well as other indexes. The long-term weather patterns may be included in the weather model as each weather variable 314 may be adjusted based on the averages of the variables during the long-term weather patterns. The variables may be weighted according to the averages of the long-term weather patterns combined with the standard averages of the baseline weather model described above. In some embodiments, the weights may be adjusted based on optimization algorithms using error analysis (e.g., least squares) to minimize the error in the model during periods of long-term weather patterns. For example, the baseline weather model may be initially determined during an El Nino year. Previous models and weights for previous El Nino years may be combined with the baseline model while providing the optimization algorithm to minimize the error in predictive models for previous years. As such, the most up-to-date models while including historical weather data for long-term weather patterns may be used to generate the weather models across the defined weather cycle (e.g., 45 days).

Similarly, short-term weather patterns may be used to perturbate the variables around the baseline averages. Short-term weather patterns may be, for example, jet stream anomalies, arctic blasts, weather variations caused by natural events such as, for example, hurricanes, dust storms, volcanic activity, earthquakes, and the like. Furthermore, short-term weather variations may be anomalous pressure systems, cloud cover, air pollution, or any other short-term factor that may influence the weather. As described above, measured variables of the short-term weather patterns may be included in the weather prediction system along with algorithms for determining optimized predictions of the weather across the periodic weather cycle (e.g., 45 days) by perturbing the variables around the baseline averages.

Figure 3A:
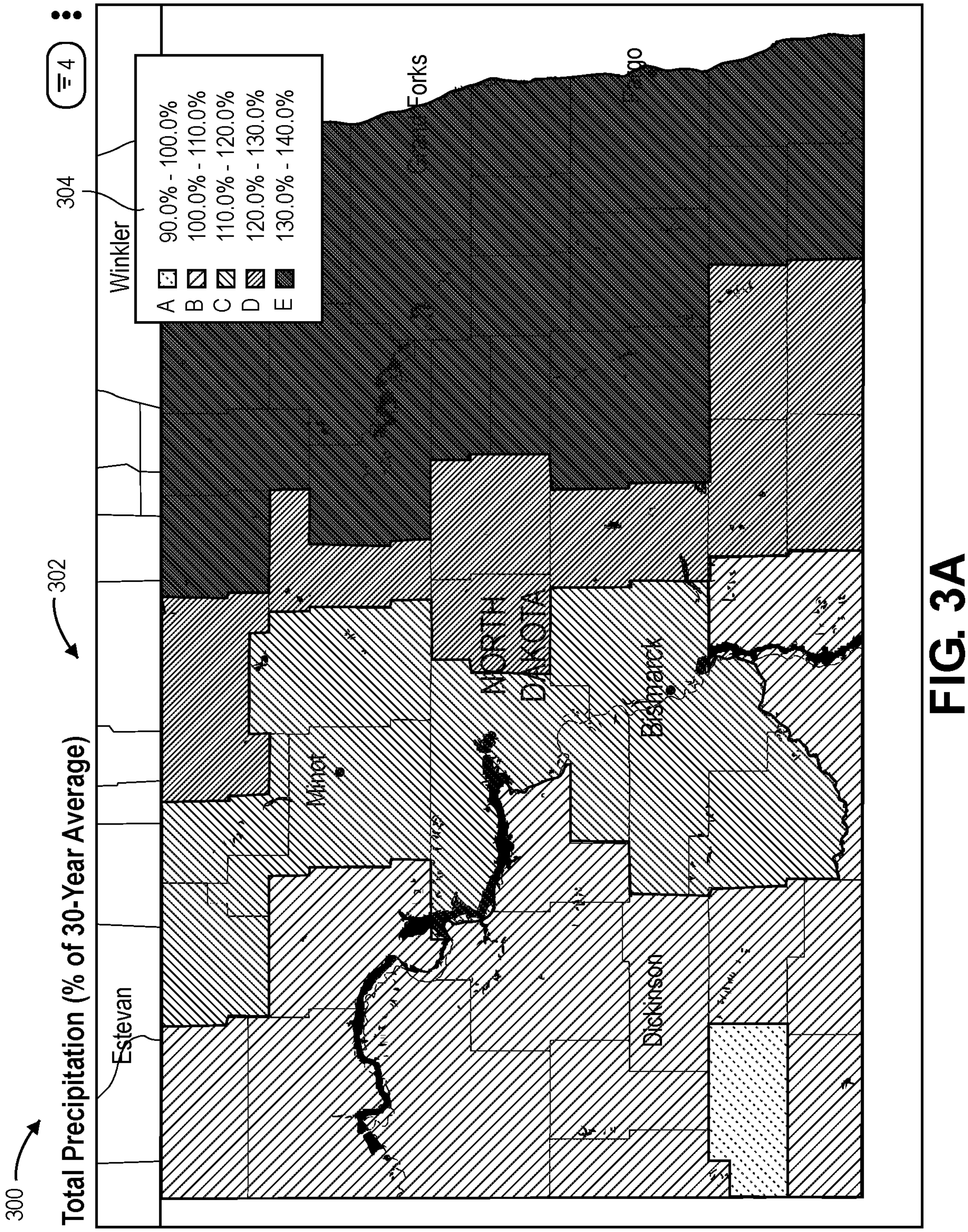
FIGS. 3A-3D depict exemplary data visualizations for embodiments of the disclosure.

FIGS. 3A-3D depict example graphics 300 caused for display by weather prediction system 200. FIG. 3A depicts precipitation graphic 302 presenting precipitation percent of the thirty-year average for 5 regions (A-E) of U.S. state North Dakota represented in first legend 304. Here, region A is the only region that is predicted to receive a lower than usual total precipitation for the designated time range, where the usual is the average of the past thirty years for that region. The baseline precipitation used for comparison here is the thirty-year average, though any time range may be used. Recent weather conditions as well as cyclic data from an exemplary 47-day cycle may be used to determine the perturbation of precipitation from the average as described below.

Figure 3B:
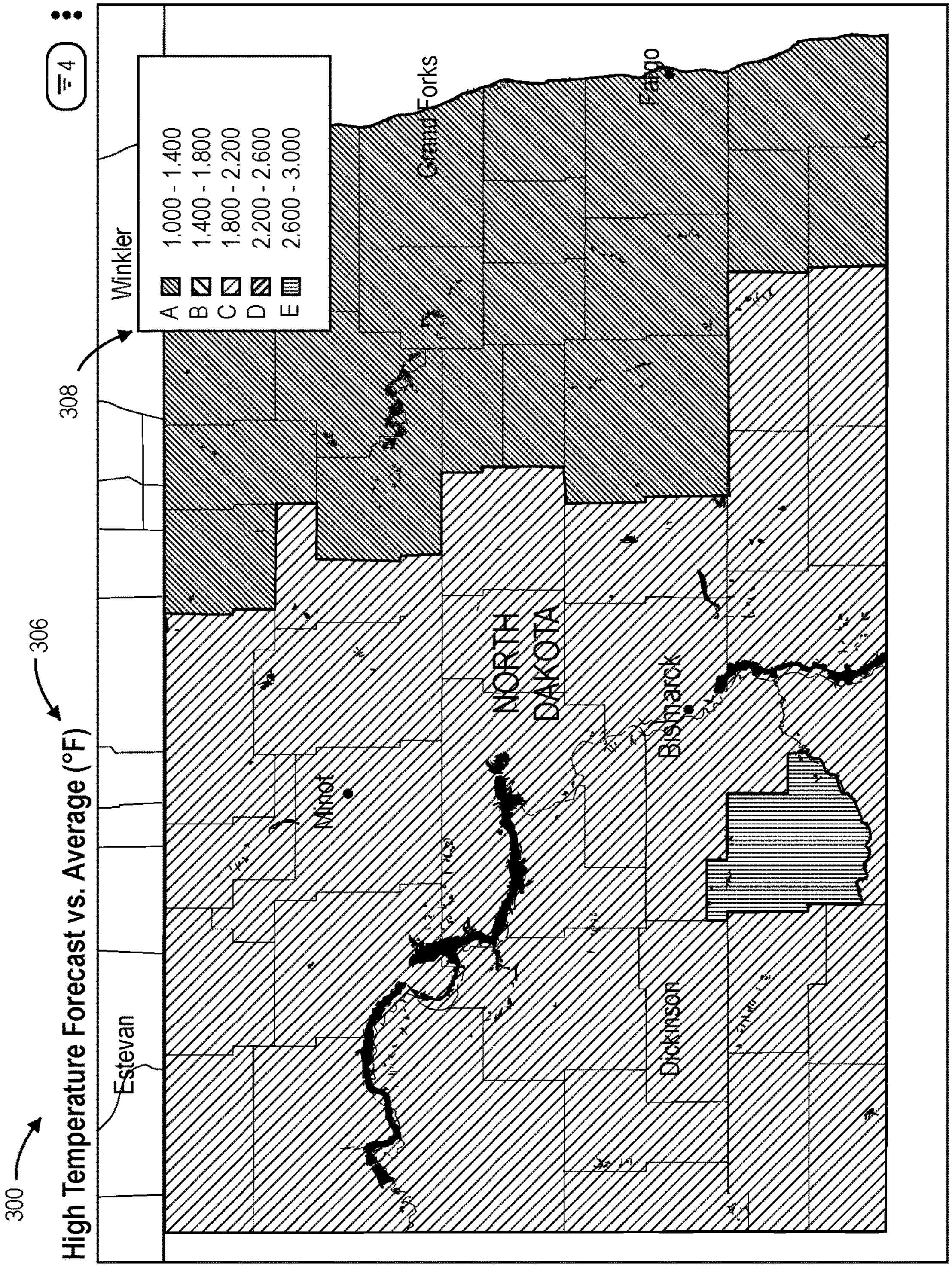

FIG. 3B depicts a high temperature forecast, on high temperature graphic 306, relative to a baseline high temperature average across a time range for each region of various regions A-E of second legend 308. Here, the high temperature average may be an average for each region averaged over the past thirty years.

First legend 304 depicts perturbed values for precipitation from the thirty-year average for a particular time range across a particular region. The perturbed values may be correction factors to change the average variable values and may also be weights to change the average weather values to be predictive of the future weather conditions. Second legend 308 depicts perturbed values for high temperature for a particular time range across a particular region. In some embodiments, the perturbed values may be generated by combining current weather patterns to the thirty-year averages to simulate the weather for that particular day. The current weather patterns may be generated based at least in part on the expected forty-five-day cycle and the weather leading up to the time range. For example, the daily weather prediction may begin with the initial thirty-year average. The thirty-year average may then be perturbed by weighting each daily prediction by the cyclic data which, in some embodiments, is included in the current weather data. Furthermore, the weather patterns leading up to each day may further change the weights that are applied to the average data. Therefore, the average daily data is changed continuously by the cyclic data and the current weather patterns for the region. As the day becomes closer, more up-to-date current data is available. Therefore, the weather prediction becomes more accurate.

In some embodiments, the various regions and boundaries may be generated based on the predictions. For example, various regions may be defined by the user or by a standard that defines regions. For example, boundaries for states, counties, countries, may be used to bound regions. The weather patterns and predictions may be determined or at least displayed within these bound regions. In some embodiments, the global weather is modeled, and weather patterns and predictions are generated visually to display only these regions.

In some embodiments, regions may be defined by similar weather patterns. As such, regions may be broken into particular deserts, rainforests, low elevations regions (e.g., Death Valley, California), high altitude regions (e.g., Mount Elbert, Colorado) and the like. In some embodiments, the regions may be generated based on the predictions. For example, the boundaries for regions A-D may be defined because of the similar precipitation and high temperatures within the boundaries and may simply be presented as a function of the precipitation and the high temperatures rather than by a geographic definition. The only applied boundary to the regions is the boundary of North Dakota and this boundary may simply be for visualization for the people of North Dakota. As such, the boundary of regions A-D and the number of regions is variable and only defined by values of 10% increments in precipitation and/or 0.4 degrees relative to the average temperatures.

Similarly, or alternatively, the number of regions may be variable. As the boundary for the regions may be variable, so too may be the number of regions. Any number of regions may be generated based on the granularity of the data presented for the region. For example, the regions presented in FIG. 3B have a granularity of 0.4° F., resulting in 5 regions. Accordingly, if the granularity had been 0.2° F., there may have been more regions such as, for example, 6, 7, or 10. The number of regions would simply be based on the high-temperature prediction distribution across the designated area.

Figure 3C:
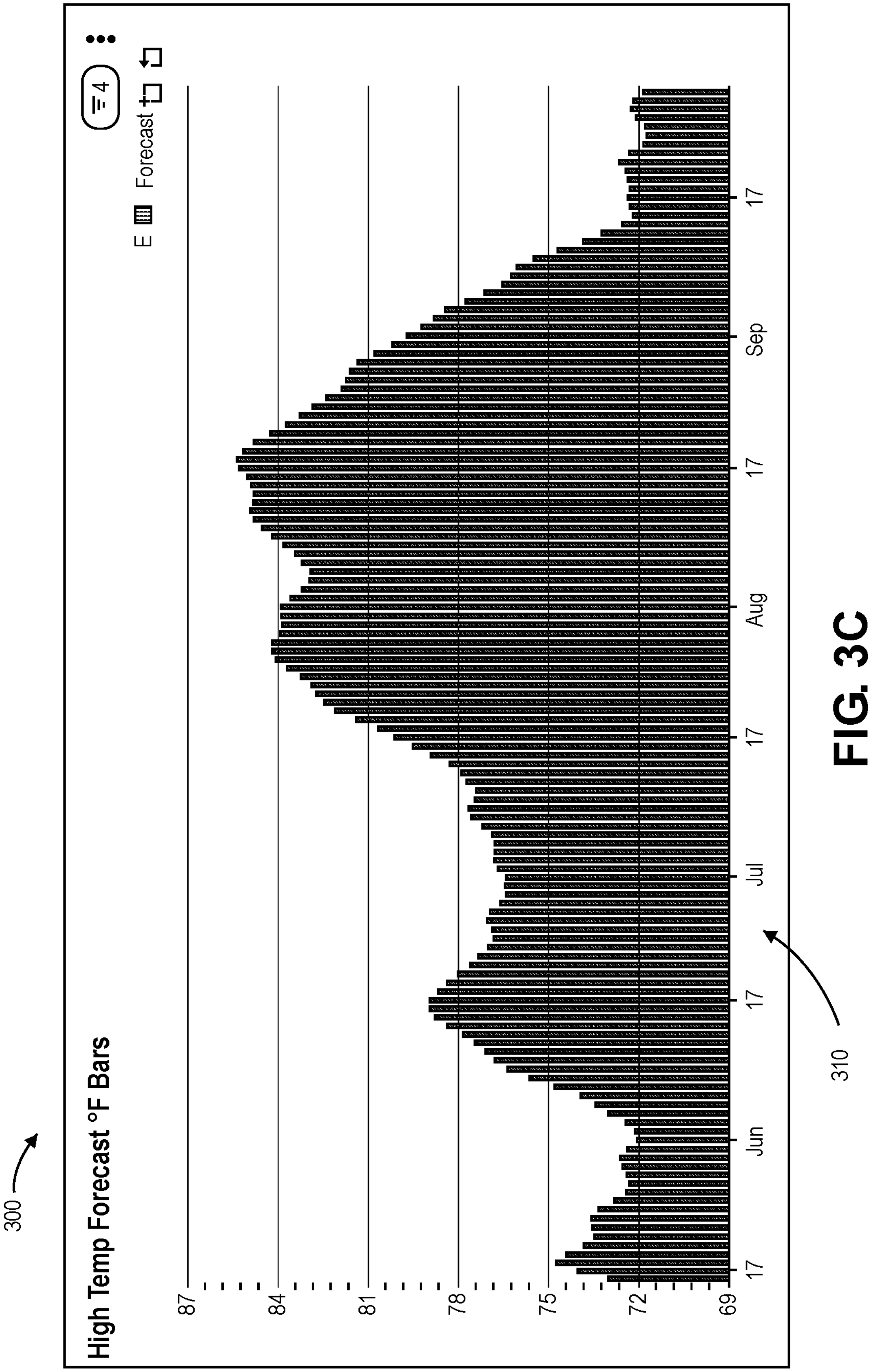

FIG. 3C depicts the average high temperature for a particular region for a designated time range. Here, the high temperature for each day from May to the end of September is shown. This bar graph may provide a simpler depiction for some weather variables 314. Any variable may be depicted visually in any standard bar, pie, topographical, or any other kind of visualization.

In some embodiments, weather variables 314 (FIG. 3D) may be selected or calculated. Weather variables 314 may be indicative of weather conditions and may be used as predictors of future weather conditions. People typically want to plan activities according to the weather; however, planning economic impact based on the weather forecast may also be valuable as described above. In some embodiments, weather variables 314 may be date, precipitation, snow, maximum temperature, minimum temperature, average temperature, average dewpoint temperature, average wind speed, maximum wind speed, average wind direction, average relative humidity, average total cloud coverage, average sea level pressure, average pressure, and any other variables that may be useful in predicting weather conditions. The list of weather variables 314 described herein is non limiting and any variables indicating weather conditions may be used. Furthermore, any weather variables 314 providing correlations with other variables, and/or indicating statistical values, and/or representing relationships between variables may be used. In some embodiments, weather variables 314 may represent times, dates, geographic locations, and any other possible value that may be useful as an input into weather prediction system 200 as described in embodiments herein.

In some embodiments, input parameters may be received by weather prediction system 200 to define bounds on the weather prediction. For example, such inputs may be start date, end data, latitude, longitude, postal code, city, state, country, and units defining the parameter values. The inputs may narrow the prediction to a specific time and location such that any user anywhere in the world may access the weather prediction system and obtain a weather prediction for a specific region at a specific time in the future. Furthermore, these inputs may define the period for which the weather cycles are predicted. As shown in FIGS. 3A-3B the location is the state of North Dakota comprising various regions A-E. FIG. 3C depicts an exemplary bar graph displaying high temperature forecasts for one region of various regions A-E for high temperature time range 310.

Figure 3D:
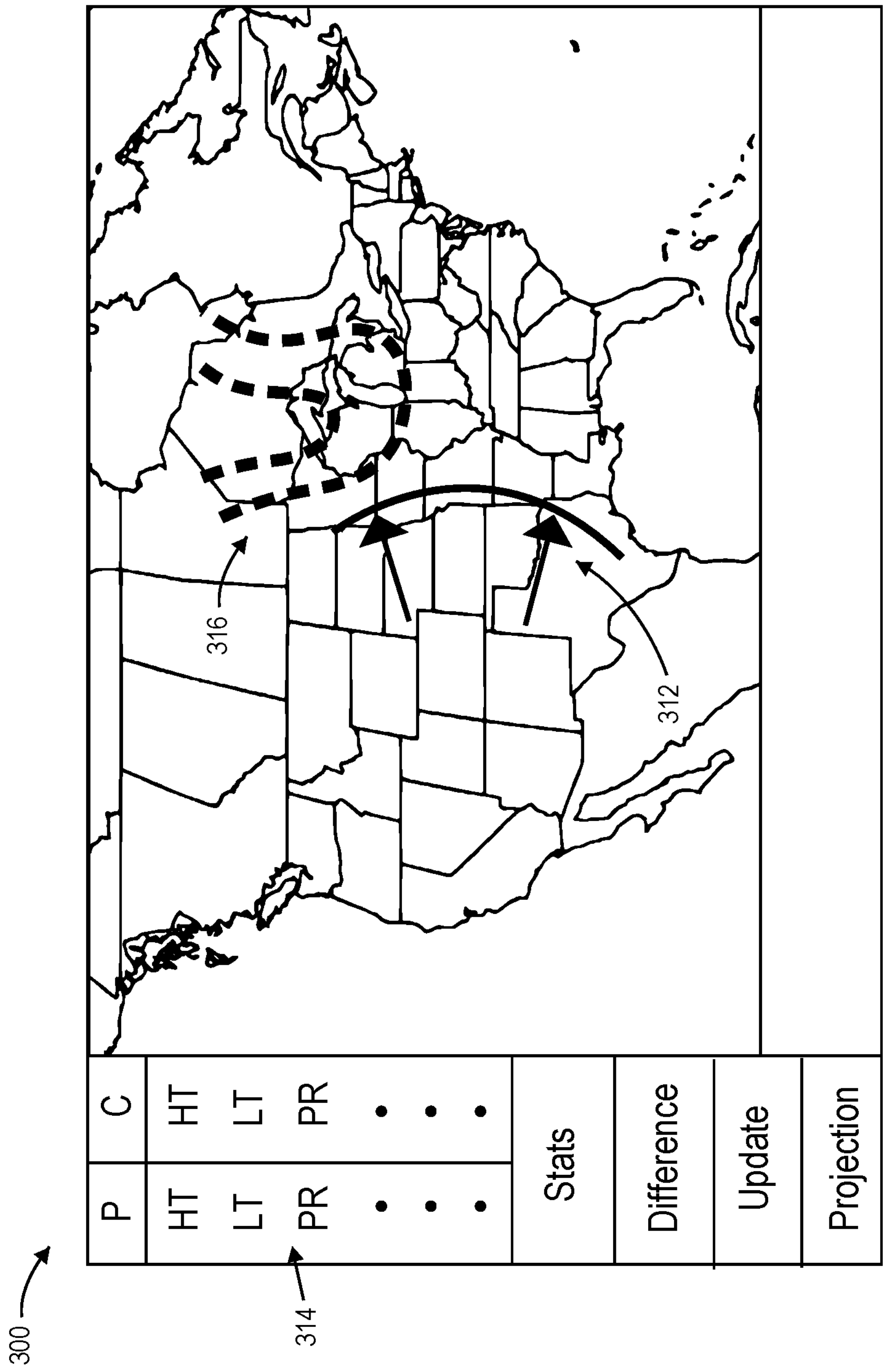

FIG. 3D depicts predicted weather conditions for the United States and Canada. As shown, any size of a region and any timeline may be used for the weather predictions and weather visualizations. The timeline displayed in FIG. 3D may be a single instant prediction showing low pressure system 312 and snowfall 316 locations. In some embodiments, the graphics 300 may show the weather simulation over a range of minutes or hours. The weather simulation may be determined from the average weather perturbed by the current weather data and the cyclic data as described in embodiments above. The weather simulation may be updated continuously as more current weather data is obtained.

In some embodiments, machine learning algorithms such as, for example, neural networks may be used to train the weather model based on the historic data. For example, correlations between variables may be determined as well as weights for each variable. A machine learning function may use example predictions along with the training data to train the weather model by reducing the error in each variable until an overall error is reduced below a designated threshold value. Furthermore, the long-term weather pattern data and the short-term weather pattern data may be incorporated into the training data when relevant. The training data may be used to train the model across many years and cycles to reduce the error until the error in the weather prediction model is below a threshold value for each day or each overall cycle. As such, an extremely accurate long-term periodic weather prediction model may be generated. The methods and algorithms provided above are not limiting, and any statistical and machine learning algorithms may be used to generate the weather prediction models described herein.

In some embodiments, predictions may be based on the weather cycles as described above. The weather cycles may repeat for months or even years. Therefore, the weather cycles may be adjusted periodically or continuously based on volatility. The accuracy of the weather prediction system may be continuously measured such that when the error is above a designated threshold based on the weather cycle, the weather cycle may be adjusted by the user or automatically based on the variable comparison data. As such, the time frame for the cycle may be adjusted to provide optimal results.

Figure 4:
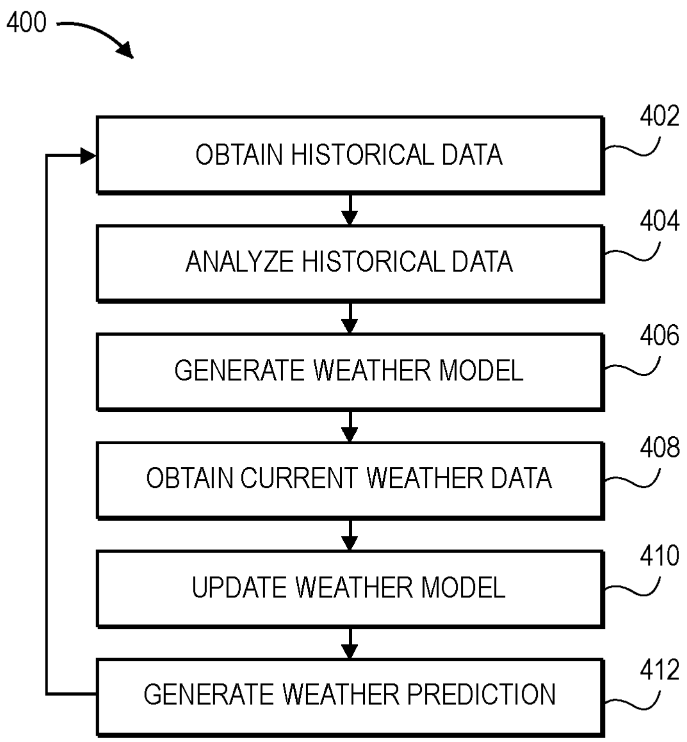
FIG. 4 depicts an exemplary method for embodiments of the disclosure.

FIG. 4 depicts an exemplary method 400 of generating a weather prediction model by weather prediction system 200 based at least in part on long-term weather averages, periodic weather patterns, and current weather data. At step 402, historic data may be obtained from a database of historic weather data. The historic weather data may be obtained from any private or public datastore and may be received and stored from world weather stations 204 as described above. As such, years of weather data around the world may be used to generate the weather prediction models described herein.

At step 404, the historic weather data may be analyzed as described in embodiments above. The historic weather data may be analyzed to determine average variable values for each day, week, month, year, or any time frame as needed. Any historical fluctuations based on long-term and short-term weather patterns may be added or subtracted from the weather models as needed based on the current weather conditions and if the current weather conditions align with the long-term and short-term weather patterns of the historical weather data.

At step 406, a weather model may be generated based on the historic weather data as described in embodiments above. The baseline weather prediction models may be generated based on the above-described historic weather data and analysis as well as inputs from the user and weather cycle information providing a time range for cyclical weather. The weather prediction models may use the weather cycle data to generate a baseline weather prediction model based on the weather cycles defined in the designated time frame as described above. In some embodiments, the baseline weather prediction model may be a structured list of variables and input data based on the averages and long-term and short-term perturbations.

At step 408, current weather data may be obtained. The current weather data may be obtained from world weather stations 204 as described above. The current weather data may be any of the variables described herein and may be obtained in real time to generate the most up-to-date weather prediction model. The average weather data may be perturbed by the cyclic weather data and the current weather data by associated weights with each weather variable.

At step 410, the weather prediction model may be generated based on the current weather data and the baseline weather prediction model. The current weather data may be incorporated into the baseline weather prediction model to perturb the variables from the variable averages. The current weather data may be indicative of anomalies such as, for example, jet stream irregularities, natural influences, high- and low-pressure systems in specific regions, and the like. As such, historical weather data, long-term and short-term weather conditions, weather cycles, and current weather conditions may be considered in the weather prediction models.

At step 412, a final weather prediction based on the weather prediction model may be generated. In some embodiments, the weather prediction model may be used to predict the weather across a time frame described by the weather cycle. Furthermore, the weather prediction model may be used to predict the weather across a plurality of weather cycles as the weather cycles repeat. As such, the weather prediction model may be used to predict the weather across a year or more. The weather prediction model generated by weather prediction system 200 may be caused for visualization by a computer such that the user may view and present the information. Furthermore, the weather prediction model may be associated with a socioeconomic model to predict weather impact across the world and plan and prepare for those impacts as described above.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

The invention claimed is:

1. A method of providing real-time adaptive weather predictions across a recurring atmospheric weather cycle, the method comprising:

obtaining historic weather data from weather databases including atmospheric variables;

generating a baseline long-range weather model by:

obtaining long-term climatological averages and recent atmospheric data, wherein the recent atmospheric data is indicative of atmospheric trends over a current year;

applying a cycle-specific index; and analyzing the historic weather data across an historic timeline by at least one machine learning algorithm by:

analyzing the long-term climatological averages, the recent atmospheric data, and the cycle-specific index to identify recurring patterns within a jet stream;

determining weather-cycle data indicative of repeating weather patterns based on the analyzing and the recurring patterns; and defining a weather-cycle timeline by correlations of weather variables of the weather-cycle data from the long-term climatological averages, the recent atmospheric data, the cycle-specific index, and the recurring patterns, wherein the weather-cycle data quantifies recurrence of the repeating weather patterns;

obtaining real-time weather data from a plurality of weather sensors located at various locations worldwide;

generating a perturbed weather model by perturbing the baseline long-range weather model based on the real-time weather data;

generating an accurate long-term weather prediction model for a location for weather forecasting based on the perturbed weather model;

determining weather impact at the location based on the accurate long-term weather prediction model, wherein the weather impact comprises estimated property damage and/or recovery impact at the location;

performing a simulation of the accurate long-term weather prediction model and displaying the simulation over a location rendering of the location associated with the accurate long-term weather prediction model to illustrate the weather impact at the location across a time range of the weather impact, wherein the time range is associated with the accurate long-term weather prediction model, determining public recommendations to reduce the estimated property damage and/or the recovery impact; and notifying a public of the weather impact and the public recommendations.

2. The method of claim 1, wherein the atmospheric variables include altitude, temperature, humidity, and precipitation.

3. The method of claim 2, wherein the weather variables are at least precipitation amount, snow accumulation, maximum temperature, minimum temperature, average temperature, average dewpoint temperature, average wind speed, maximum wind speed, average wind direction, average relative humidity, average total cloud coverage, average sea level pressure, average pressure, and any subset and other variables that may be useful for weather prediction, and related variable such as Heating Degree Days (HDD), Cooling Degree Days (CDD), and Growing Degree Days (GDD).

4. The method of claim 1, wherein the weather-cycle timeline is dynamically determined each model year based on correlations of the atmospheric variables and falls between a range of forty-five to ninety days.

5. The method of claim 1, wherein the weather-cycle timeline is a user-provided cycle length for a model year.

6. The method of claim 1, further comprising determining potential ensemble outcomes based on initial conditions.

7. The method of claim 1, further comprising discarding outliers indicative of weather anomalies.

8. The method of claim 1, further comprising:

determining a plurality of regions based at least in part on similar predicted weather conditions for each region of the plurality of regions;

displaying the plurality of regions comprising boundaries defined by the similar predicted weather conditions; and generating and displaying at least one geographic boundary comprising the plurality of regions.

9. One or more non-transitory computer-readable media storing computer-executable instructions that, when executed by at least one processor, perform a method of detecting weather and providing adaptive weather predictions across a weather cycle, the method comprising:

obtaining historic weather data from weather databases, wherein the historic weather data is indicative of historic weather conditions from various locations;

analyzing the historic weather data across an historic timeline by at least one machine learning algorithm to:

identify repeating weather patterns and generate weather-cycle data indicative of the repeating weather patterns;

generate a baseline weather model for predicting the weather based on the historic weather data; and generate an adjusted weather model by adjusting the baseline weather model based at least in part on the weather-cycle data by generating correction factors associated with weather variables of the baseline weather model;

obtaining real-time weather data from a plurality of weather sensors;

generating a perturbed weather model by perturbing the adjusted weather model based on the real-time weather data;

generating an accurate long-term weather prediction model for a location for weather forecasting based on the perturbed weather model, wherein the accurate long-term weather prediction model includes recurrence of the repeating weather patterns adjusted based on the real-time weather data;

determining weather impact at the location across a long-term weather cycle based on the accurate long-term weather prediction model, wherein the weather impact comprises estimated property damage and/or recovery impact across the long-term weather cycle;

simulating the accurate long-term weather prediction model and displaying the simulation over a location rendering of the location associated with the accurate long-term weather prediction model to illustrate the weather impact at the location across a time range of the weather impact, wherein the time range is associated with the accurate long-term weather prediction model, and notifying a public of the weather impact at the various locations.

10. The media of claim 9, wherein the method further comprises:

determining a region based at least in part on similar predicted weather conditions; and displaying the region comprising boundaries defined by the similar predicted weather conditions.

11. The media of claim 10, wherein the method further comprises:

defining a geographic region comprising at least one boundary for display, and displaying the boundaries within the geographic region.

12. The media of claim 10, wherein the method further comprises determining how a market associated with a particular region will be impacted by the accurate long-term weather prediction model.

13. The media of claim 12, wherein the market is agriculture or a socioeconomic recovery from expected damage based on the weather impact.

14. The media of claim 9, further comprising defining a weather-cycle timeline based on the weather-cycle data, wherein the weather-cycle timeline varies annually based on correlation of atmospheric fields within a range of forty-five to ninety days.

15. A system for providing weather predictions across a prediction timeline, the system comprising:

at least one processor;

a data store; and one or more non-transitory computer-readable media storing computer-executable instructions that, when executed by the at least one processor, perform a method comprising:

obtaining historic weather data from weather databases;

analyzing the historic weather data across an historic timeline by at least one machine learning algorithm to:

identify repeating weather patterns and generate weather-cycle data indicative of the repeating weather patterns, defining a weather-cycle timeline by correlations of weather variables that quantify recurrence of the repeating weather patterns;

generate a long-term baseline weather model for predicting weather based on the historic weather data; and generate an adjusted weather model by adjusting the long-term baseline weather model based at least in part on the weather-cycle data;

obtaining real-time weather data from a plurality of weather sensors located at various positions worldwide;

generating a perturbed weather model by perturbing the long-term baseline weather model based on the real-time weather data;

generating an accurate long-term weather prediction model for a location forecasting the weather for the location based on the perturbed weather model, wherein the accurate long-term weather prediction model includes recurrence of the repeating weather patterns adjusted based on the real-time weather data;

determining a weather impact to a market associated with the location based on the accurate long-term weather prediction model, wherein the weather impact includes estimated property damage and/or recovery impact over a timeline of the accurate long-term weather prediction model;

performing a simulation of the accurate long-term weather prediction model and displaying the simulation over a location rendering of the location associated with the accurate long-term weather prediction model to illustrate the weather impact at the location across the timeline of the weather impact, and notifying the market of the weather impact.

16. The system of claim 15, wherein the market is agriculture or a socioeconomic recovery, and wherein the method further comprises determining potential ensemble outcomes based on initial conditions.

17. The system of claim 15, wherein the method further comprises:

determining the weather variables from the historic weather data;

determining an average for each variable of the weather variables from the historic weather data;

determining a correction factor for each variable based at least in part on the weather-cycle data and the real-time weather data; and applying the correction factor to the average for each variable for generating the accurate long-term weather prediction model.

18. The system of claim 15, wherein the weather-cycle timeline is dynamically determined and varies annually based on correlation of atmospheric fields within a range of forty-five to ninety days.

19. The system of claim 15, wherein the method further comprises:

determining a region based at least in part on similar predicted weather conditions; and displaying the region comprising boundaries defined by the similar predicted weather conditions.

20. The system of claim 19, wherein the method further comprises:

generating at least one geographic boundary to display; and generating and displaying the boundaries within the at least one geographic boundary.

* * * * *